(12) United States Patent
Jin

(10) Patent No.: US 10,121,275 B2
(45) Date of Patent: Nov. 6, 2018

(54) TILE-BASED RENDERING METHOD AND APPARATUS

(71) Applicant: Samsung Electronics Co., Ltd., Suwon-si, Gyeonggi-do (KR)

(72) Inventor: Seunghun Jin, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 236 days.

(21) Appl. No.: 14/946,291

(22) Filed: Nov. 19, 2015

(65) Prior Publication Data

US 2016/0260241 A1  Sep. 8, 2016

(30) Foreign Application Priority Data

Mar. 2, 2015  (KR) .................. 10-2015-0029113

(51) Int. Cl.
*G06T 15/00* (2011.01)
*G06T 11/20* (2006.01)

(52) U.S. Cl.
CPC ............ *G06T 15/005* (2013.01); *G06T 11/20* (2013.01)

(58) Field of Classification Search
CPC .................................................. G06T 15/005
See application file for complete search history.

(56) References Cited

U.S. PATENT DOCUMENTS

| 2004/0066384 A1 | 4/2004 | Ohba |
| 2004/0238732 A1 | 12/2004 | State et al. |
| 2011/0148892 A1* | 6/2011 | Shreiner ................. G06T 11/40 345/545 |
| 2013/0265318 A1* | 10/2013 | Schneider ................ G06T 1/60 345/532 |
| 2014/0068168 A1 | 3/2014 | Murrin et al. |
| 2014/0375663 A1* | 12/2014 | Pfaffe ....................... G06T 1/60 345/545 |
| 2016/0171751 A1* | 6/2016 | Doyle ..................... G06T 15/40 345/421 |

FOREIGN PATENT DOCUMENTS

| JP | 2013-38651 | 2/2013 |
| JP | 2013-38651 A | 2/2013 |
| KR | 10-0790892 | 12/2007 |
| KR | 10-0790892 B1 | 12/2007 |
| KR | 10-1187530 | 9/2012 |
| KR | 10-1187560 B1 | 9/2012 |

OTHER PUBLICATIONS

Hall, et al. "Rendering in Cars 2." ACM SIGGRAPH, 2011, powerpoint presentation.

* cited by examiner

*Primary Examiner* — Charles Tseng
(74) *Attorney, Agent, or Firm* — Harness, Dickey & Pierce, P.L.C.

(57) ABSTRACT

A tile-based rendering method and a tile-based rendering apparatus are provided. The tile-based rendering method involves performing tile binning on a first image and a second image having binocular disparity using a plurality of graphic processors based on a draw command, determining a tile of the second image having a highest similarity to a tile of the first image based on a result of the tile binning, determining a tile rendering order for each tile of the first image and the second image, based on a result of the determining of the tile of the second image having a highest similarity to the tile of the first image, and performing tile rendering, according to the determined tile rendering order.

15 Claims, 12 Drawing Sheets

DRAW COMMAND 0        DRAW COMMAND 1        DRAW COMMANDS 0, 1

TILE-BASED RENDERING METHOD AND APPARATUS

CROSS-REFERENCE TO RELATED APPLICATION

This application claims the benefit under 35 USC 119(a) of Korean Patent Application No. 10-2015-0029113, filed on Mar. 2, 2015, in the Korean Intellectual Property Office, the entire disclosure of which is incorporated herein by reference for all purposes.

BACKGROUND

1. Field

The following description relates to a method of tile-based rendering on a binocular disparity image and a rendering apparatus that performs the same.

2. Description of Related Art

Graphics processing apparatuses, such as a graphics processing unit (GPU), perform graphics data rendering in computing apparatuses. In general, the graphics processing apparatus generates a frame for display by converting graphics data corresponding to two-dimensional (2D) or three-dimensional (3D) objects into 2D pixels. The computing apparatus may include not only personal computers (PCs), laptop computers, video game consoles, but also embedded devices such as smartphones, tablet devices, and wearable devices. It is difficult for embedded devices having characteristics of relatively low processing capability and relatively large power consumption to have the same graphics processing capability as workstations like PCs, laptop computers, and video game consoles that have sufficient memory space and processing power. However, portable devices such as smartphones or tablet devices are widely distributed, and users play games or watch contents such as movies or dramas through their smart phones or tablet devices. Accordingly, to meet user demand, graphics processing apparatus manufacturers have conducted much research into improving performance of graphics processing apparatuses and to improve processing efficiency of embedded devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a tile-based rendering method involves performing tile binning on a first image and a second image having binocular disparity using a plurality of graphic processors based on a draw command, determining a tile of the second image having a highest similarity to a tile of the first image based on a result of the tile binning, determining a tile rendering order for each tile of the first image and the second image based on a result of the determining of the tile of the second image having a highest similarity to the tile of the first image, and performing tile rendering, according to the determined tile rendering order.

The performing of the tile binning may further involve receiving the draw command, dividing the draw command into batches and assigning the batches to the graphics processors, and in response to a first batch from among the batches being assigned to a first graphics processor among the plurality of graphics processors, performing tile binning on each of the first and second images, based on the first batch and state information corresponding to the first batch.

The determining of the tile of the second image having the highest similarity to the tile of the first image may involve obtaining binning information indicating whether the draw command is performed on each tile of the first image and the second image, based on a result of the tile binning, and determining the tile of the second image having the highest similarity to the tile of the first image, based on the obtained binning information.

The determining of the tile of the second image having the highest similarity to the tile of the first image may involve generating a bitstream including identification information of the draw command for each tile of the first image and the second image, based on a result of the tile binning, and determining the tile of the second image having the highest similarity to the tile of the first image, by comparing a bitstream of the tile of the first image and a bitstream of each of a plurality of tiles of the second image.

The tile of the second image having the highest similarity to the tile of the first image may be determined by comparing a bitstream of a first tile of the first image and a bitstream of each of the plurality of tiles of the second image corresponding to the first tile in a predetermined range.

The tile rendering order may be determined such that the determined tiles of the first image and the second image are sequentially tile-rendered by the same graphics processor.

The draw command may involve state information of each of the first image and second image.

The general aspect of the method may further involve performing tile rendering on each tile of the first image and the second image of a current time point; determining a representative depth value of depth values of the tile of the first image of the current time point, and determining the tile of the second image of the current time point corresponding to the tile of the first image of the current time point, based on the representative depth value; determining a tile rendering order for each tile of the first image and the second image of a next time point, based on the determined tiles of the first image and the second image of the current time point; and performing tile rendering of the next time point, according to the determined tile rendering order.

In another general aspect, a tile-based rendering apparatus includes a plurality of graphics processors configured to perform tile binning on a first image and a second image having binocular disparity, based on a draw command, a tile correlator configured to determine a tile of the second image having a highest similarity to a tile of the first image, based on a result of the tile binning, and a scheduler configured to determine a tile rendering order for each tile of the first image and the second image, based on a result of the determining of the tile of the second image having a highest similarity to the tile of the first image, and the plurality of graphics processors is configured to perform tile rendering according to the determined tile rendering order.

The scheduler may be configured to receive the draw command, divide the draw command into batches, and assign the batches to a plurality of graphics processors; and the first graphics processor is configured to, in response to the scheduler assigning a first batch from among the batches to a first graphics processor of the plurality of graphics processors, perform tile binning on each of the first image and the second image based on the first batch and state information corresponding to the first batch.

The correlator may be configured to obtain binning information indicating whether the draw command is performed on each tile of the first image and the second image, based on a result of the tile binning, and to determine the tile of the second image having the highest similarity to the tile of the first image, based on the obtained binning information.

The correlator may be configured to generate a bitstream including identification information of the draw command for each tile of the first image and the second image, based on a result of the tile binning, and to determine the tile of the second image having the highest similarity to the tile of the first image, by comparing a bitstream of the tile of the first image and a bitstream of each of a plurality of tiles of the second image.

The correlator may be configured to determine the tile of the second image having the highest similarity to the tile of the first image by comparing a bitstream of a first tile of the first image and a bitstream of each of the plurality of tiles of the second image corresponding to the first tile in a predetermined range.

The scheduler may be configured to determine the tile rendering order such that the determined tiles of the first image and the second image are sequentially tile-rendered by the same graphics processor.

The plurality of graphics processors may be configured to perform tile rendering on each tile of the first image and the second image of a current time point; the tile correlator may be configured to determine a representative depth value of depth values of the tile of the first image of the current time point, and to determine the tile of the second image of the current time point corresponding to the tile of the first image of the current time point, based on the representative depth value; the scheduler may be configured to determine a tile rendering order for each tile of the first image and the second image of a next time point, based on the tiles of the first image and the second image of the determined current time point; and the plurality of graphics processors may be configured to perform tile rendering of the next time point, according to the determined tile rendering order.

The draw command may include state information of each of the first image and the second image.

In another general aspect, a non-transitory computer readable storage medium has stored thereon a program, which when executed by a computer, performs the method described above.

In yet another general aspect, a tile-based rendering apparatus includes a plurality of graphics processors configured to render a first image and a second image having a binocular disparity, and a scheduler configured to divide a draw command for the first image and the second image into batches and assign the batches to the plurality of graphics processors, and the scheduler is configured to determine a tile rendering order used by the plurality of graphic processors to render the first image and the second image based on a similarity of a tile of the first image to a tile of the second image.

The general aspect of the apparatus further includes a tile correlator configured to determine the similarity of the tile of the first image to the tile of the second image.

The plurality of graphics processors may be configured to perform tile binning on the first image and the second image in response to the scheduler assigning the batches to the plurality of graphics processors.

The scheduler may be configured to assign at least one batch among the batches to two or more graphics processors among the plurality of graphics processors.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

As used herein, the term "and/or" includes any and all combinations of one or more of the associated listed items. Expressions such as "at least one of," when preceding a list of elements, modify the entire list of elements and do not modify the individual elements of the list.

When a part may "include" a certain constituent element, unless specified otherwise, it may not be construed to exclude another constituent element but may be construed to further include other constituent elements.

While such terms as "first," "second," etc., may be used to describe various components, such components must not be limited to the above terms. The above terms are used only to distinguish one component from another.

In the following description, embodiments of the present inventive concept are described below in detail with reference to the accompanying drawings.

Figure 1:
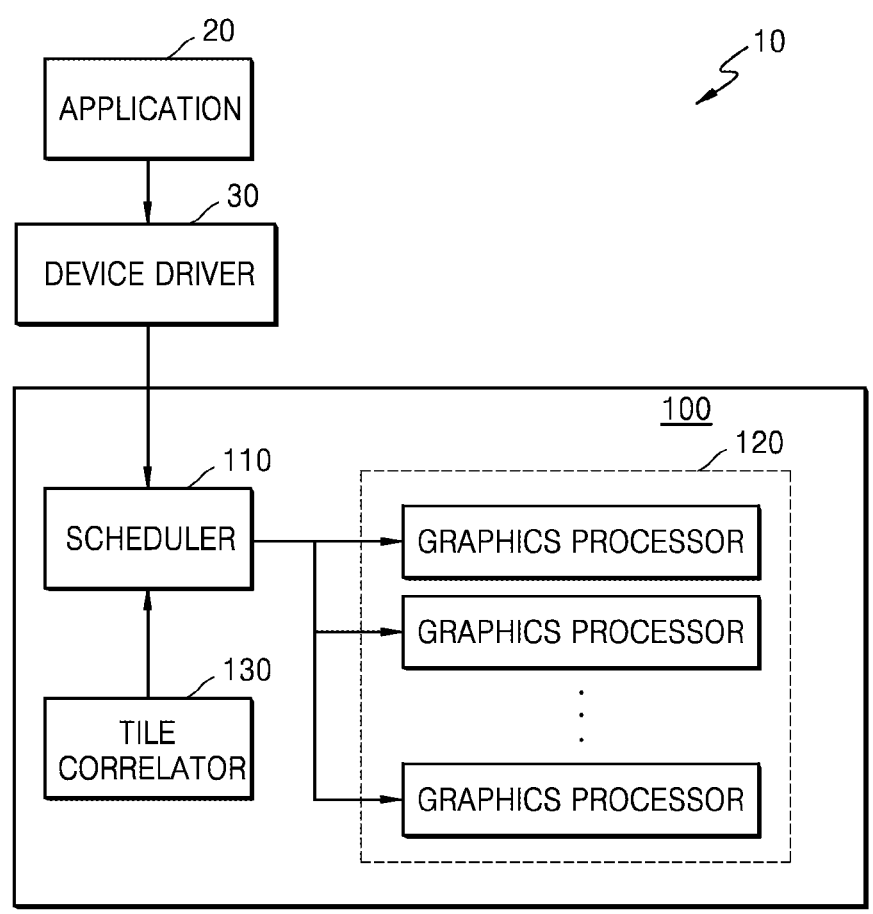
FIG. 1 is a diagram of an example of a rendering system.

FIG. 1 illustrates an example of a rendering system 10.

The rendering system 10 may include an application 20, a device driver 30, and a rendering apparatus 100. FIG. 1 illustrates only a limited number of elements of the rendering system 10 for conciseness. Accordingly, one of ordinary skill in the art may understand that common elements other than the elements illustrated in FIG. 1 are further included.

Referring to FIG. 1, the application 20 provides information related to tile rendering on a binocular disparity image to the device driver 30 through an application program interface (API). The application 20 may provide information related to tile rendering on a binocular disparity image, to the device driver 30, through an API standard such as OpenGL, OpenGL ES, or Direct 3. In other words, the application 20 may provide information related to rendering on a first image and a second image having binocular disparity, to the device driver 30, through API to generate a binocular disparity image. For example, the first image may be an image relating to a left eye, and the second image may be an image relating to a right eye. Also, the application 20 may explicitly provide the information related to rendering on the respective first and second images having binocular disparity, to the device driver 30, through extension of the API.

The device driver 30 analyzes the API received from the application 20, converts the API to a command that may be processed by the rendering apparatus 100, and transmits the command to the rendering apparatus 100. The device driver 30 may transmit to the rendering apparatus 100 at least one draw command for the first and second images having binocular disparity. The draw command is a command indicating which object is to be rendered on a predetermined image or frame. According to one example, the draw command may be presented as a drawcall. The draw command may be, for example, a command to draw a predetermined number of triangles and rectangles in an image or frame.

The device driver 30 may transmit state information related to the draw command, with the draw command, to the rendering apparatus 100. The state information indicates a state of being bound to the draw command. Also, the state information may denote information needed to render a predetermined object. For example, the state information may include texture type, camera viewpoint information, and source data like coordinate information about a predetermined object, and the state information may be presented as a state. The device driver 30 may transmit one draw command and state information for each of the first and second images having binocular disparity to the rendering apparatus 100. Since the first and second images are images of the same object viewed from different viewpoints, the state information on the first and second images may be provided such that only the camera viewpoint information is differently presented for each of the first and second images and the other information may be identically presented for each of the first and second images. In other words, the device driver 30 may transmit a pair of state information for the first and second images with one draw command to the rendering apparatus 100.

In this example, the rendering apparatus 100 performs tile-based rendering on the first and second images having binocular disparity, based on the draw command and the state information about the binocular disparity image received from the device driver 30.

Referring to FIG. 1, the rendering apparatus 100 includes a scheduler 110, a plurality of graphics processors 120, and a tile correlator 130. Further, one of ordinary skill in the art would understand that the rendering apparatus 100 may include common elements other than the elements illustrated in FIG. 1. Further, the scheduler 110 and the tile correlator 130 may be implemented with one or more processors and memories.

The scheduler 110 may receive at least one draw command and at least one piece of state information about the first and second images having binocular disparity from the device driver 30. In the following description, for convenience of explanation, the first and second images having binocular disparity are described as the first and second images.

The scheduler 110 may divide at least one draw command into batches having a predetermined unit, and respectively assign the batches to the graphics processors 120. For example, the scheduler 110 may divide one hundred draw commands for one hundred primitives into batches, each having twenty draw command for twenty primitives, and assign the one hundred draw commands as five batches to each of the graphics processors 120. Also, according to the present example, when the scheduler 110 assigns batches to each of the graphics processors 120, the scheduler 110 may assign one batch to one graphics process 120 twice for each of the first and second images. In other words, when assigning a first batch of the batches to a first graphics processor of the graphics processors 120, the scheduler 110 may assign the first batch to the first graphics processor for the first image and the first batch to the first graphics processor for the second image. A detailed embodiment is described with reference to FIG. 2.

The graphics processors 120 perform tile binning on each of the first and second images according to the assigned batches. The tile binning may be a process of dividing the first and second images into a predetermined number of tiles and generating binning information that indicates whether the draw command is performed on each tile of the first and second images. In detail, the tile binning is to divide each of a first frame to embody the first image and a second frame to embody the second image into a predetermined number of tiles. For example, when the first frame of 100×100 pixels is divided into four tiles, the size of one tile is 25×25 pixels. Accordingly, in the following description, assuming that the dividing of the first image into a predetermined number of tiles is equivalent to dividing the first frame to embody the first image into a predetermined number of tiles, the expression of a tile of the first image is regarded to be the same as a tile included in the first frame to embody the first image. Also, the tile binning may be a process of generating a tile list indicating in which tile of the first and second images vertices, primitives, or patches forming 2D or 3D objects are included. Also, the tile binning may be a process of obtaining information about the vertex or primitive included in each tile of the first and second images. An example of the information about the vertex or primitive may be information about an identifier, a position, a color, and texture of the vertex or primitive.

The graphics processors 120 may perform tile binning the tile binning on each of the first and second images according to the assigned batches and the state information related to the assigned batches. Among the graphics processors 120 according to this example, a first graphics processor may receive a first batch of the assigned batches and the state information related to the first batch. Since the state information related to the first batch includes camera viewpoint information of each of the first and second images, even when the first batch is assigned only once, the first graphics processor may perform each of tile binning about the first image and the tile binning about the second image according to the first batch and the state information related to the first batch. Also, according to one example, the first graphics processor may be assigned with the first batch and the state information related to the first batch, twice, for each of the first and second images, and the first graphics processor may perform each of the tile binning for the first image and the tile binning for the second image. A detailed embodiment related to the tile binning is described below with reference to FIG. 2.

Figure 2:
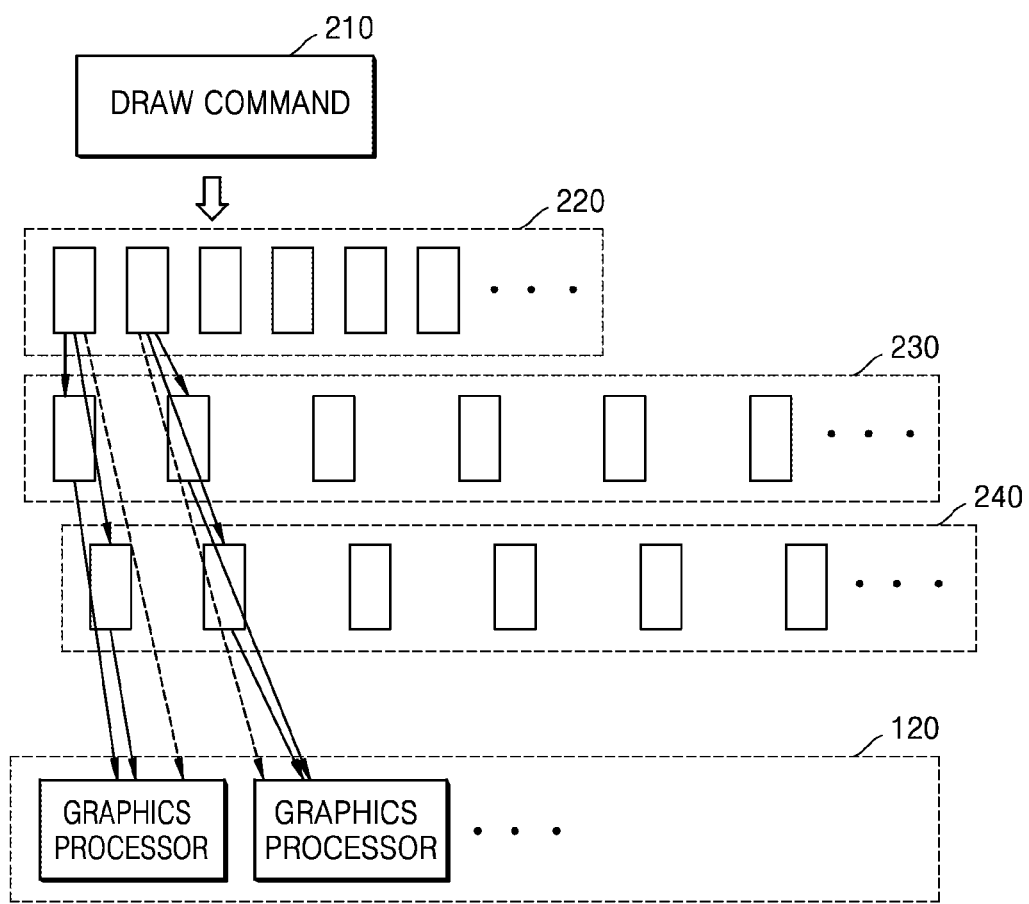
FIG. 2 is a diagram illustrating a tile binning process performed by an example of a rendering apparatus.

FIG. 2 illustrates an example in which the rendering apparatus 100 performs tile binning.

In this example, the scheduler 110 divides a draw command 210 into a plurality of batches 220. Also, the scheduler 110 assigns the batches 220 to the graphics processors 120 as a plurality of batches 230 for the first image and the batches 220 to the graphics processors 120 as a plurality of batches 240 for the second image. In other words, the scheduler 110 assigns the batches 220 twice to the graphics processors 120.

The graphics processors 120 perform tile binning on each of the first and second images, based on the assigned batches and the state information related to the assigned batches.

Alternatively, as indicated by dotted arrows in FIG. 2, the scheduler 110 may assign the batches 220 only once to the graphics processors 120. Also, the scheduler 110 may store the state information related to the batches 220 in a buffer (not shown) in each of the graphics processors 120. Accordingly, each of the graphics processors 120 may perform the tile binning for the first image and the tile binning for the second image according to the state information stored in the buffer and the batches 220.

Accordingly, since a batch assigned to a graphics processor targets at the same primitive, the graphics processor may perform tile binning on a target of the same primitive for each of the first and second images, based on the assigned batch, which may reduce access to an external memory where information about the primitive is stored.

The graphics processors 120 of FIG. 1 perform the tile binning on each of the first and second images and transmit binning information generated as a result of the tile binning to the tile correlator 130. Also, the graphics processors 120 may store the binning information generated as a result of the tile binning in a separate memory.

In this example, the tile correlator 130 obtains binning information indicating whether the draw command is performed on each tile of the first and second images, based on a result of the tile binning. In other words, the tile correlator 130 may receive the binning information from the graphics processors 120 or obtain the binning information from the separate memory.

The tile correlator 130 determines a tile of the second image having the highest similarity to a tile of the first image, based on the binning information. In other words, the tile correlator 130 may determine the tile of the second image having the highest similarity to a tile of the first image for each tile of the first image. In this example, the tile correlator 130 may generate a bitstream including identification information of each of a plurality of draw commands for each tile of the first and second images, based on the obtained binning information. In other words, the bitstream generated for each tile of the first and second images may indicate whether the draw command is performed on each tile, through the identification information of each draw command. For example, when a bitstream of a predetermined tile of the first image is "010", the bitstream "010" may indicate that only the second draw command of the first draw command, the second draw command, and the third draw command is performed on a predetermined tile. Accordingly, the tile correlator 130 may determine the tile of the second image having the highest similarity to a predetermined tile, through the comparison between the bitstream of a predetermined tile of the first image and the bitstream of each tile of the second image. Also, the tile correlator 130 may find a bitstream that is most similar to a bitstream of a predetermined tile, by using an XOR operation. Also, the tile correlator 130 may determine a tile having the highest similarity to a tile of the first image among the tiles of the second image, by comparing a bitstream of a tile of the first image and a bitstream of each tile of the second image corresponding to a tile of the first image in a predetermined range. A detailed embodiment is described below with reference to FIGS. 3 and 4.

Figure 3:
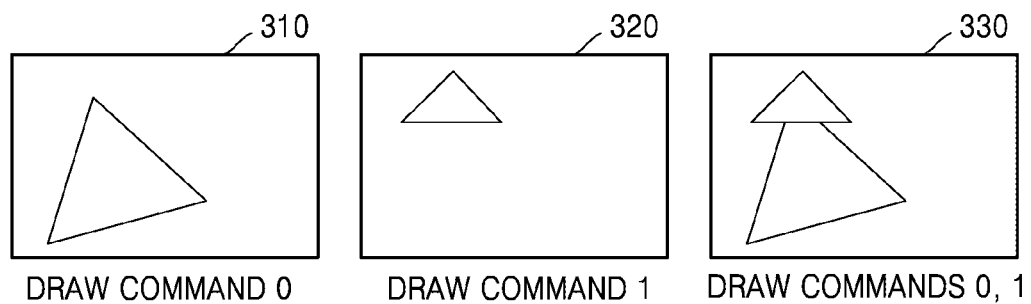
FIG. 3 is a diagram illustrating a bitstream generating process performed by an example of a rendering apparatus.
Figure 3:
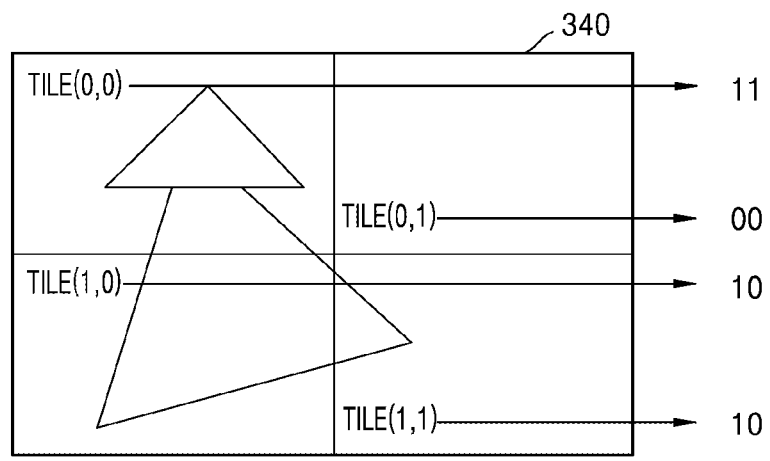

FIG. 3 illustrates an example in which the rendering apparatus 100 generates a bitstream of each tile.

An image 310 of FIG. 3 illustrates an image obtained as a result of performing a draw command 0 with the rendering apparatus 100 with a scene. An image 320 illustrates an image obtained as a result of performing a draw command 1 with the rendering apparatus 100. An image 330 illustrates an image obtained as a result of performing draw commands 0 and 1 with the rendering apparatus 100 sequentially.

The rendering apparatus 100 may divide an image 340 into four tiles by performing tile binning, as illustrated in FIG. 3, and obtain binning information indicating whether the draw commands 0, 1 are performed on each tile. Accordingly, the rendering apparatus 100 may generate a bitstream including identification information of the draw commands 0, 1 for each tile of the image 340, based on the binning information. In other words, the rendering apparatus 100 may generate a bitstream of a tile (0,0) to be "11", a bitstream of a tile (0,1) to be "00", a bitstream of a tile (1,0) to be "10", and a bitstream of a tile (1,1) to be "10". The bitstream "11" may be interpreted such that both of the draw commands 0, 1 are performed. The bitstream "10" may be interpreted such that only the draw command 0 is performed. The bitstream "01" may be interpreted such that only the draw command 1 is performed. The bitstream "00" may be interpreted such that none of the draw commands 0, 1 are performed.

Figure 4:
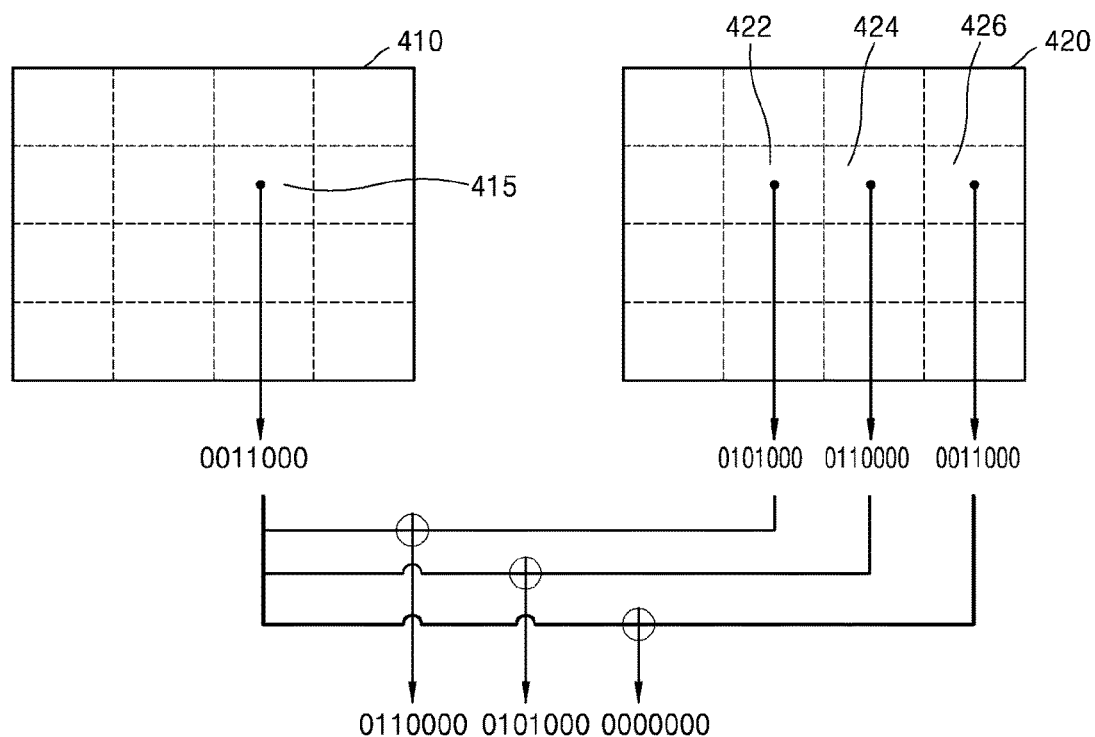
FIG. 4 is a diagram illustrating a process of determining a tile of a second image having the highest similarity with a tile of a first image, according to an example of a rendering apparatus.

FIG. 4 illustrates an example in which the rendering apparatus 100 determines a tile of a second image having the highest similarity with a tile of a first image.

Referring to FIG. 4, the rendering apparatus 100 generates a bitstream for each of sixteen tiles of a first image 410 and a bitstream for each of sixteen tiles of a second image 420. The rendering apparatus 100 generates a bitstream of a file 415 of the sixteen tiles of the first image 410 to be "0011000". In other words, the bitstream "0011000" signifies that, of draw commands 0 to 7, draw commands 3 and 4 are performed in the tile 415. Accordingly, the rendering apparatus 100 may determine a tile among the tiles of the second image 420 that is the most similar to the tile 415.

The rendering apparatus 100 compares a bitstream of the tile 415 and a bitstream of each of the sixteen files in the second image 420. Also, in this example, the rendering apparatus 100 compares the bitstream of the tile 415 and a bitstream of each of the tiles of the second image 420 corresponding to the tile 415 of the first image 410 in a predetermined range. Since the first and second images have binocular disparity, the tiles in the left and right sides are highly likely to be similar to each other. Accordingly, the rendering apparatus 100 compares the bitstream of the tile 415 with the bitstream of a tile 424 in the second image 420 corresponding to the position of the tile 415 and tiles 422 and 426 at the left and right sides of the tile 424. In other words, the rendering apparatus 100 may compare a bitstream "0011000" of the tile 415 and bitstreams "0101000", "0110000", and "0011000" of the tiles 422, 424, and 426. Although FIG. 2 illustrates a range of the tile 424 and one more tile at each of the left and right sides of the tile 424, the direction and the number of the tiles are not limited to the above illustrated in FIG. 4.

According to this example, the rendering apparatus 100 seeks a bitstream that is most similar to the bitstream of the tile 415 by using an XOR operation. Thus, the rendering apparatus 100 produces a bitstream "0110000" through an XOR operation between the bitstream "0011000" of the tile 415 and the bitstream "0101000" of the tile 422, a bitstream "0101000" through an XOR operation between the bitstream "0011000" of the tile 415 and the bitstream "0110000" of the tile 424, and a bitstream "0000000" through an XOR operation between the bitstream "0011000" of the tile 415 and the bitstream "0011000" of the tile 426. Accordingly, the rendering apparatus 100 may select the bitstream "0000000" having the least number of "1" among the produced bitstreams "0110000", "0101000", and "0000000". In other words, the rendering apparatus 100 may determine the tile 426 of the second image 420 that is most similar to the tile 415 of the first image 410 through the bitstream "0000000".

Also, the rendering apparatus 100 may determine the tile 424 of the second image 420 corresponding to the position of the tile 415 of the first image 410 to be a tile that is most similar to the tile 415, without any separate operation process.

The tile correlator 130 of FIG. 1 according to the present example does not generate a bitstream at a draw level, but may generate a bitstream including identification information of each primitive or vertex included in the draw command for each tile of the first and second images, based on the obtained binning information. In other words, the bitstream generated for each tile of the first and second images may indicate, through the identification information of each primitive or vertex, whether each primitive or vertex is presented on the tile. For example, in the event that a bitstream of a predetermined tile of the first image 410 is "010", the bitstream "010" signifies that only the second primitive of the first primitive, the second primitive, and the third primitive is presented on the predetermined tile. Accordingly, the tile correlator 130 may determine a tile of the second image 420 having the highest similarity to the predetermined tile, through the comparison between the bitstream of the predetermined tile of the first image 410 and the bitstream of each tile of the second image 420.

Also, the tile correlator 130 may determine a tile of the second image 420 that is most similar to a tile of the first image 410, and generate a tile correlation table showing the tile of the first image 410 and the tile of the second image 420 which are determined to be similar to each other. According to one example, the tile correlator 130 may transfer the tile correlation table to the scheduler 110 or store the correlation table in the separate memory.

The scheduler 110 according to the present embodiment may determine a tile rendering order for each tile of the first and second images, based on the determination of the tile of the second image 420 that is most similar to the tile of the first image 410 which is performed by the tile correlator 130. Also, the scheduler 110 according to the present embodiment may determine the tile rendering order for each tile of the first and second images, based on the tile correlation table received from the tile correlator 130 or stored in the separate memory. The scheduler 110 according to the present embodiment may determine the tile rendering order so that the tile of the first image 410 and the tile of the second image 420 having the highest similarity are simultaneously or sequentially tile-rendered by the same graphics processor. A detailed embodiment is described below with reference to FIGS. 5 and 6.

Figure 5:
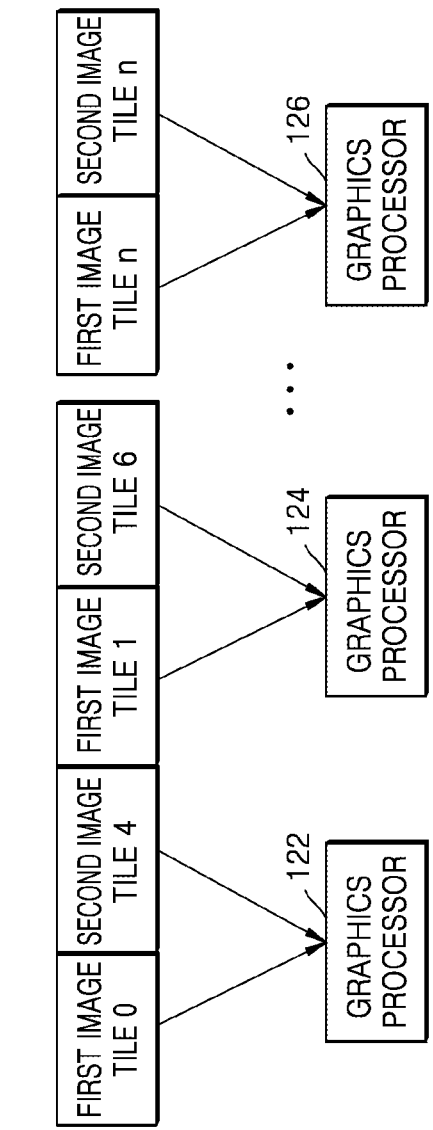
FIG. 5 is a diagram illustrating a process of determining a tile rendering order, according to an example of a rendering apparatus.

FIG. 5 illustrates an example in which the rendering apparatus 100 determines a tile rendering order.

In this example, the tile correlator 130 generates a tile correlation table 510 showing the tile of the second image that is most similar to the tile of the first image. The tile correlation table 510 shows that a tile 0 in the first image and a tile 4 in the second image are most similar to each other, a tile 1 in the first image and a tile 6 in the second image are most similar to each other, and a tile n in the first image and a tile n in the second image are most similar to each other.

Accordingly, the scheduler 110 may determine the tile rendering order, based on the tile correlation table 510 such that the tiles of the first and second images are simultaneously or sequentially tile-rendered by the same graphics processor. In other words, the scheduler 110 may determine tile rendering order for each tile of the first and second images such that the tile 0 of the first image and the tile 4 of the second image are tile-rendered by a graphics processor 122, the tile 1 of the first image and the tile 6 of the second image are tile-rendered by a graphics processor 124, and the tile n of the first image and the tile n of the second image are tile-rendered by a graphics processor 126.

Figure 6A:
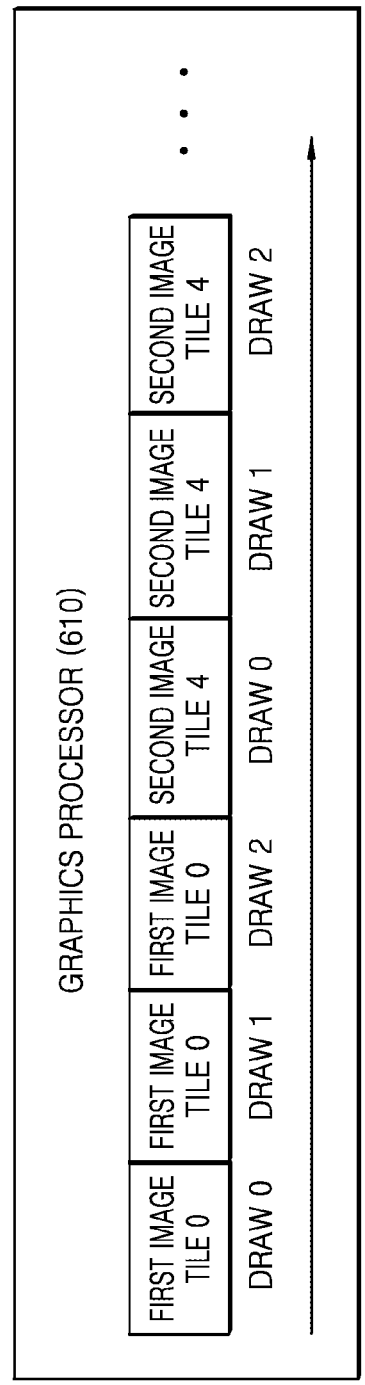
FIGS. 6A and 6B are diagrams illustrating a process of determining a tile rendering order, according to an example of a rendering apparatus.
Figure 6B:
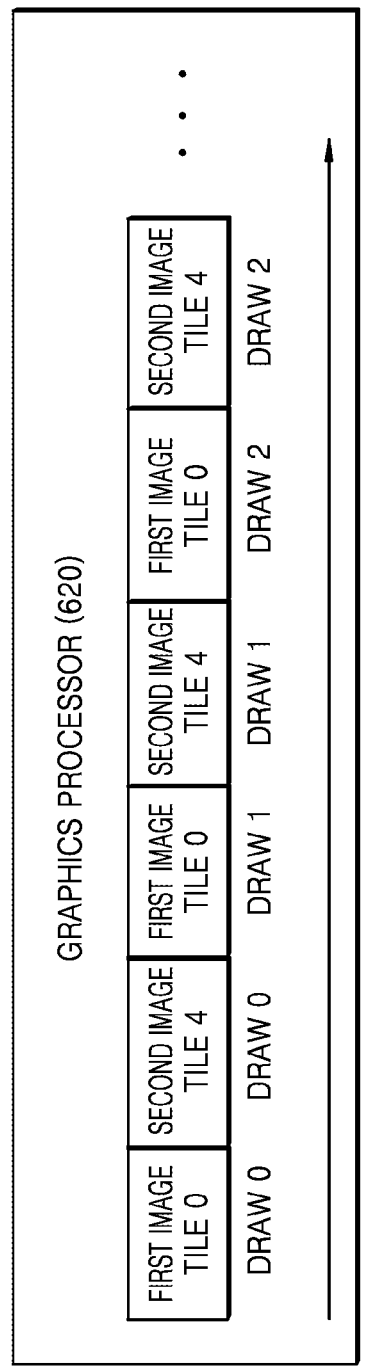

FIGS. 6A and 6B illustrate an example in which the rendering apparatus 100 determines a tile rendering order.

In this example, the scheduler 110 determines the tile rendering order according to the method of FIG. 6A or FIG. 6B.

In FIG. 6A, when the scheduler 110 assigns the tile 0 of the first image and the tile 4 of the second image having the highest similarity to a graphics processor 610, a tile rendering order may be determined such that tile rendering is performed on the tile 4 of the second image according to the draw command after tile rendering is performed on the tile 0 of the first image according to the draw command. In other words, when the draw command includes draw 0, draw 1, and draw 2, the scheduler 110 may determine the tile rendering order such that tiling renderings are performed on the tile 0 of the second image according to the draws 0, 1, and 2 after tile renderings are all performed on the tile 0 of the first image according to the draws 0, 1, and 2.

Also, in FIG. 6B, when the tile 0 of the first image and the tile 4 of the second image having the highest similarity are assigned to the graphics processor 620, the scheduler 110 may determine the tile rendering order such that tile rendering according to the draw command is alternately performed on the tile 0 of the first image and the tile 4 of the second image. In other words, when the draw command includes draw 0, draw 1, and draw 2, the scheduler 110 may determine the tile rendering order such that tile rendering according to the draw 0 is performed on the tile 0 of the first image and tile 4 of the second image, tile rendering according to the draw 1 is performed on the tile 0 of the first image and the tile 4 of the second image, and then tile rendering according to draw 2 is performed on the tile 0 of the first image and the tile 4 of the second image.

The graphics processors 120 of FIG. 1 may perform tile rendering on each tile of the first and second images according to the determined tile rendering order.

When the tile-based rendering is performed, although each tile may be drawn on an on-chip memory in the graphics processor, an off-chip memory may be accessed to obtain information such as a vertex or texture needed for rendering. Accordingly, the rendering apparatus 100 simultaneously or sequentially renders the tiles of the first and second images which are similar to each other by the same graphics processor, thereby reducing access to the off-chip memory. Also, since the data read out from the off-chip memory during the rendering of the tile of the first image is highly likely to be reused for rendering of the tile of the second image at a cache level, overall performance of the rendering apparatus 100 may be improved.

According to the present embodiment, the graphics processors 120 of FIG. 1 may perform tile rendering on the first and second images of a current time point (or a current frame). The graphics processors 120 may generate depth information about each tile of the first image or the second image by performing tile rendering. The depth information about each tile may indicate depth values of pixels in each tile.

The tile correlator 130 may determine the tile of the second image corresponding to the tile of the first image, based on the depth information of the first image. The tile correlator 130 may determine a representative depth value for each tile of the first image, based on the depth information of the first image. For example, the tile correlator 130 may determine a depth value having the highest frequency among the depth values included in the tile of the first image, as the representative depth value of the tile. The tile correlator 130 may determine the tile of the second image corresponding to the tile of the first image, based on the determined representative depth value. In detail, the tile correlator 130 may determine the tile of the second image corresponding to the tile of the first image, by using Equation 1 below.

$$d = b \times \frac{f}{z}$$ [Equation 1]

In Equation 1, "d" denotes a distance between a coordinate of a tile of the first image and a coordinate of a tile of the second image corresponding to the tile of the first image, "b" denotes a baseline among camera-related parameters, "f" denotes a focal length among the camera-related parameters, and "z" denotes a representative depth value. Accordingly, since "b" and "f" are not included in the state information, the tile correlator 130 may obtain a value of "d" by using the representative depth value and determine the tile of the second image corresponding to the tile of the first image by using "d". The present embodiment is described below in detail with reference to FIG. 7.

Figure 7:
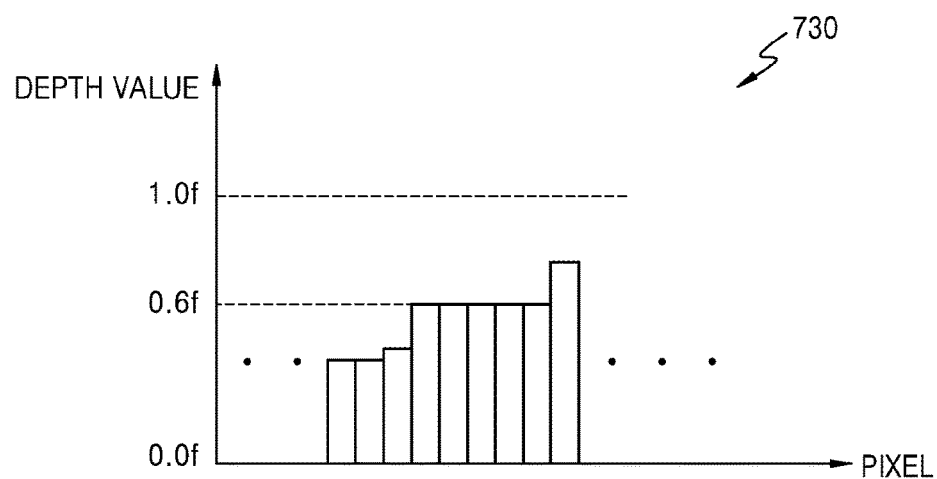
FIG. 7 is a diagram illustrating a process of determining a tile of a second image corresponding to a tile of a first image, according to an example of a rendering apparatus.
Figure 7:
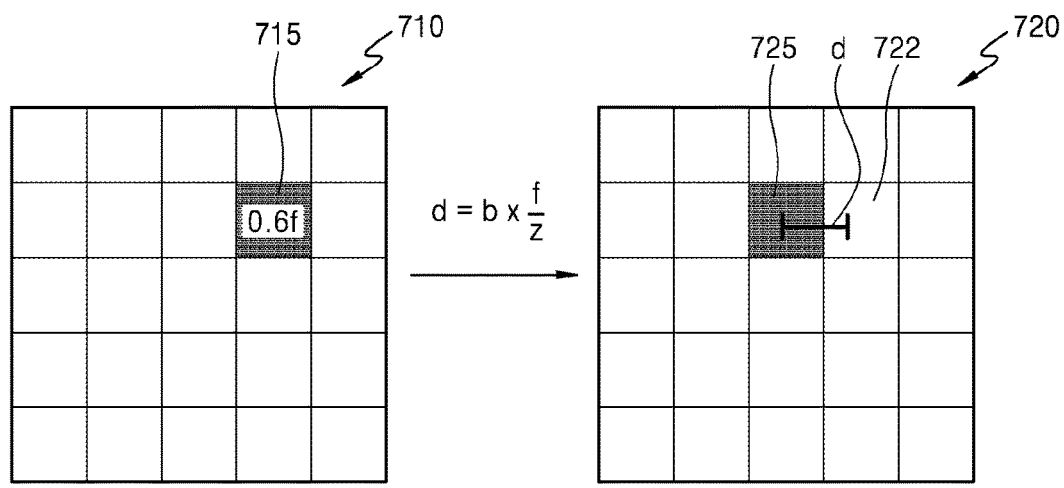

FIG. 7 illustrates an example in which the rendering apparatus 100 determines a tile in the second image corresponding to a tile in the first image.

In this example, the tile correlator 130 generates a depth histogram 730 with respect to a tile 715 of the first image 710, based on the depth information. The depth histogram 730 shows depth values of pixels in the tile 715. The tile correlator 130 determines a representative depth value of the tile 715, based on the depth information or the depth histogram 730. In the illustrated example, the tile correlator 130 determines 0.6 f as a depth value having the highest frequency among the depth values of the tile 715, and determines 0.6 f as the representative depth value.

In response, the tile correlator 130 calculates a value "d" by using the representative depth value "0.6 f" and Equation 1, and determines a tile 725 that is separated by the value "d" from a tile 722 of the second image corresponding to the position of the tile 715. In other words, the tile correlator 130 may determine the tile 725 of the second image corresponding to the tile 715 of the first image by using the value "d".

The scheduler 110 determines a tile rendering order of a next time point (or a next frame) following a current time point (or a current frame), based on the tile of the second image corresponding to the tile of the first image.

Accordingly, the rendering apparatus 100 may determine the tile of the second image corresponding to the tile of the first image, based on the depth information obtained according to a result of the tile rendering on the first and second images of the current time point, and determine a tile rendering order of a next time point, based on the determined tiles of the first and second images. Also the rendering apparatus 100 may perform tile rendering on the first and second images of the next time point, according to the determined tile rendering order.

Figure 8:
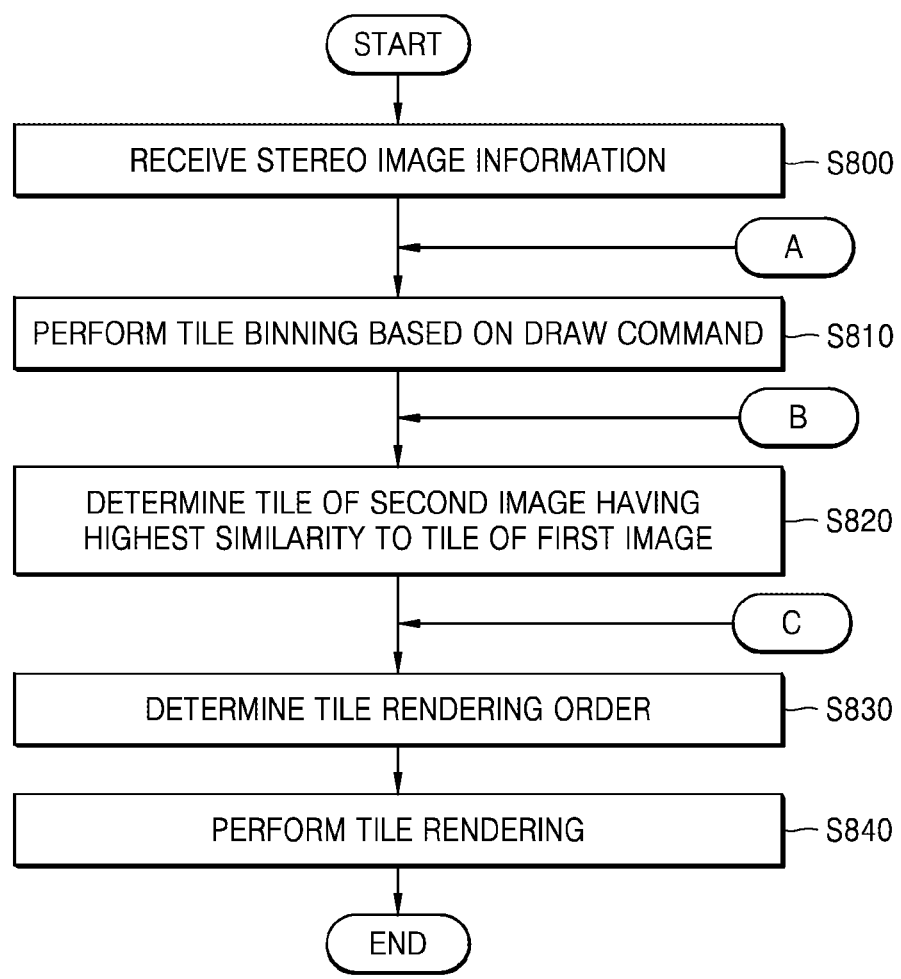
FIG. 8 is a flowchart illustrating an example of a method of tile rendering performed by a rendering apparatus.

FIG. 8 is a flowchart for explaining an example of a method in which the rendering apparatus 100 performs tile rendering.

The method described with reference to FIG. 8 may be performed by components of the rendering apparatus 100 illustrated in FIG. 1, and a repeated description thereof is omitted.

In S800, the rendering apparatus receives stereo image information from which a first image and a second image having binocular disparity may be constructed. For example, the stereo image information may be retrieved from an external memory.

In S810, the rendering apparatus 100 may perform tile binning on each of the first and second images having binocular disparity, based on at least one draw command. The rendering apparatus 100 may receive, from the outside, the at least one draw command and at least one state information related to the at least one draw command. Accordingly, the rendering apparatus 100 may perform tile binning, based on the at least one draw command and the at least one state information. An example of the tile binning process is described below in detail with reference to FIG. 9.

Figure 9:
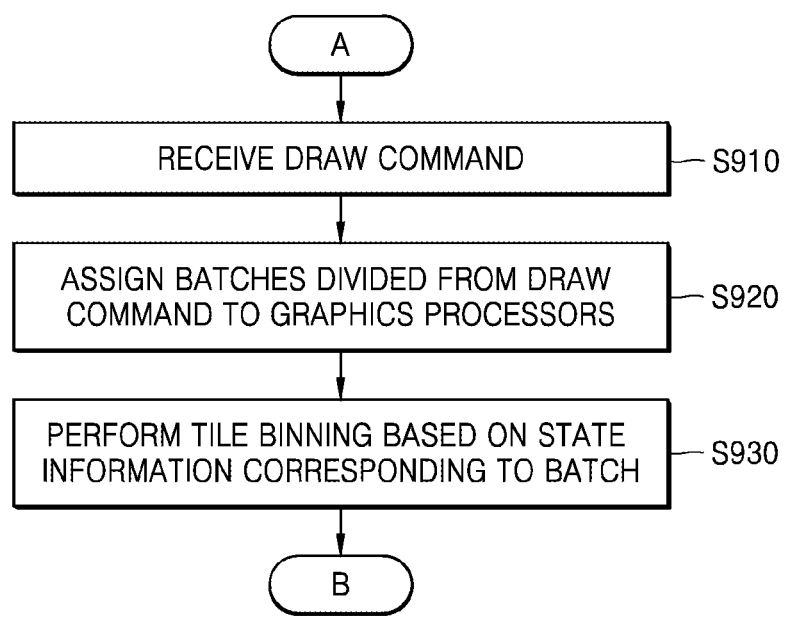
FIG. 9 is a flowchart illustrating an example of a tile binning operation performed during the tile rendering method of FIG. 8.

FIG. 9 is a flowchart for explaining in detail the operation S810 of FIG. 8, according to one example.

In S910, the rendering apparatus 100 may receive at least one draw command and the least one state information related to the at least one draw command, from the outside.

In S920, the rendering apparatus 100 according to the present embodiment may divide the at least one draw command into batches, each having a predetermined unit, and assign the divided batches respectively to a plurality of graphics processors in the rendering apparatus 100. Also, according to the present embodiment, the rendering apparatus 100 may assign the batches to the respective graphics processors twice for each of the first and second images. In other words, when the first batch of the batches is assigned to the first graphics processor among the graphics processors, the rendering apparatus 100 may assign the first batch to the first graphics processor for the first image and the first batch to the first graphics processor for the second image.

In S930, the rendering apparatus 100 may perform the tile binning on each of the first and second images, based on the assigned batches and the state information corresponding to the batches, according to the present embodiment. In detail, the graphics processors in the rendering apparatus 100 may be assigned twice with the batches and the state information related to the batches. Accordingly, the graphics processors may respectively perform the tile binning for the first image and the tile binning for the second image. Also, since the state information related to the batches includes the camera viewpoint information of each of the first and second images, even when the batches and the state information are assigned once, the graphics processors may perform the tile binning for the first image and the tile binning for the second image.

In S820 of FIG. 8, the rendering apparatus 100 may determine the tile of the second image having the highest similarity to the tile of the first image, based on a result of tile binning. The rendering apparatus 100 may obtain binning information indicating whether the draw command is performed on each tile of the first and second images, based on a result of the tile binning. The rendering apparatus 100 may determine the tile of the second image having the highest similarity to the tile of the first image, based on the binning information. An embodiment of determining the tile of the second image having the highest similarity to the tile of the first image is described below in detail with reference to FIG. 10.

Figure 10:
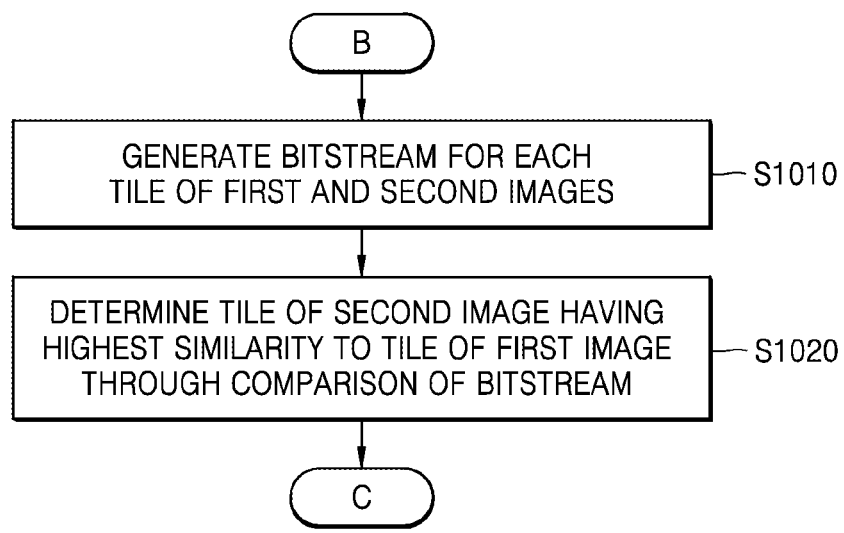
FIG. 10 is a flowchart illustrating an example of a process of determining a tile of the second image having the highest similarity to a tile of the first image.

FIG. 10 is a flowchart for explaining an example of a method by which the rendering apparatus 100 determines the tile of the second image having the highest similarity to the tile of the first image.

In S1010, the rendering apparatus 100 generates a bitstream including identification information of each draw command for each tile of the first and second images, based on the binning information. In other words, the bitstream generated for each tile of the first and second images may indicate whether the draw command is performed on each tile through the identification information of the draw command. Also, the rendering apparatus 100 may generate a bitstream including identification information of each of the primitive or vertex including in the draw command for each tile of the first and second images, based on the obtained binning information, not a bitstream at a draw level. In other words, the bitstream generated for each tile of the first and second images may indicate whether each primitive or vertex is presented on each tile through the identification information of each primitive or vertex.

In S1020, the rendering apparatus 100 determines the tile of the second image having the highest similarity to the tile of the first image, through the comparison between the bitstream of the tile of the first image and the bitstream of each tile of the second image. Also, the rendering apparatus 100 may seek the bitstream that is most similar to the bitstream of a predetermined tile, by using an XOR operation. Also, the rendering apparatus 100 may determine the tile of the second image having the highest similarity to the tile of the first image, by comparing the bitstream of the tile of the first image and the bitstream of each tile of the second image corresponding to the position of the tile of the first image in a predetermined range.

In S830 of FIG. 8, the rendering apparatus 100 determines the tile rendering order for each tile of the first and second images, based on the tile of the second image that is most similar to the tile of the first image. Also, the rendering apparatus 100 may determine the tile rendering order such that the tiles of the first and second images having the highest similarity are simultaneously or sequentially tile-rendered by the same graphics processor.

In S840, the rendering apparatus 100 performs tile rendering on each tile of the first and second images according to the determined tile rendering order.

Figure 11:
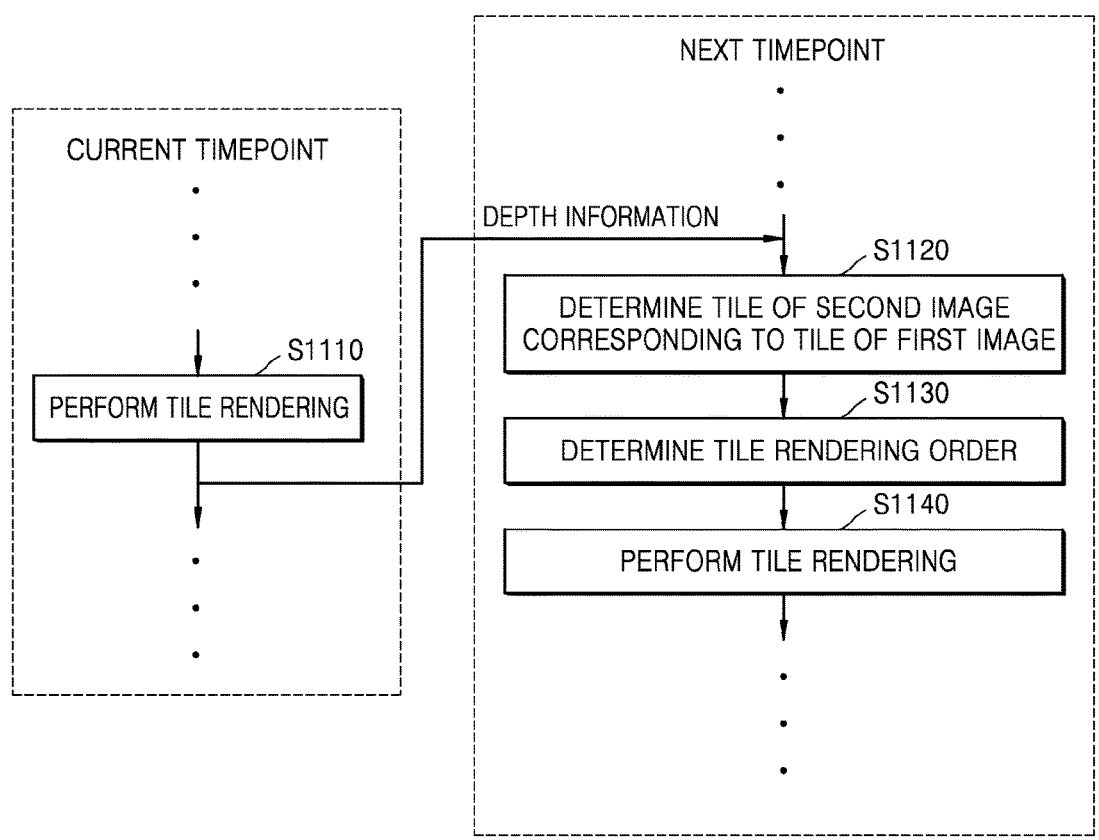
FIG. 11 is a diagram illustrating an additional example of a tile rendering method. Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 11 illustrates an example of a method in which the rendering apparatus 100 performs tile rendering.

The method of FIG. 11 may be performed by components of the rendering apparatus 100 of FIG. 1 and redundant descriptions thereof are omitted. Also, the method of FIG. 11 may include the method described with reference to FIG. 8.

In S1110, the rendering apparatus 100 may perform tile rendering on the first and second images of a current time point (or a current frame). The rendering apparatus 100 may generate depth information of each tile of the first or second image by performing the tile rendering. The depth information of each tile may indicate depth values of pixels in each tile.

In S1120, the rendering apparatus 100 determines the tile of the second image corresponding to the tile of the first image, based on the depth information in the first image. The rendering apparatus 100 may determine a representative depth value for each of the first image, based on the depth information in the first image. For example, the rendering apparatus 100 may determine a depth value having the highest frequency of the depth values included in each tile of the first image as a representative depth value of each tile. The rendering apparatus 100 may determine the tile of the second image corresponding to the tile of the first image, based on the determined representative depth value.

In S1130, the rendering apparatus 100 determines a tile rendering order of a next time point (or a next frame) following the current time point (or a current frame), based on the determined tiles of the first and second images. In other words, the rendering apparatus 100 may determine the tile of the second image corresponding to the tile of the first image, based on the depth information obtained according to a result of the tile rendering on the first and second images of the current time point, and determine a tile rendering order of the next time point, based on the determined tiles of the first and second images.

In S1140, the rendering apparatus 100 performs tile rendering on the first and second images of the next time point, according to the determined tile rendering order.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

The apparatus may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

The use of terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

According to the above-described embodiments, in the first and second images having binocular disparity, the tile of the second image that is most similar to the tile of the first image may be determined. Also, a rendering order of the tiles of the first and second image may be determined such that the tiles of the first and second images which are similar to each other are rendered by the same graphics processor. Since the tiles of the first and second images which are similar to each other are rendered by the same graphics processor, unnecessary access to the external memory is reduced and thus efficient rendering is available.

The apparatuses, units, modules, devices, drivers, schedulers, tile correlators, graphics processors and other components illustrated in FIGS. 1, 5, 6A and 6B that perform the operations described herein with respect to FIGS. 2-4 and 7-10 are implemented by hardware components. Examples of hardware components include controllers, sensors, generators, drivers, processors, chips, memories and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2-4 and 7-11. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-4 and 7-11 performed by a processor or a computer as described above executing instructions or software to perform the operations described herein. Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A tile-based rendering method comprising:
   performing tile binning on a first image and a second image having binocular disparity, using one or more graphic processors, based on a draw command;
   determining a tile of the second image having a highest similarity to a tile of the first image by comparing binning data of each tile of the second image to binning data of the tile of the first image;
   determining a tile rendering order for each tile of the first image and the second image, based on a result of the determining of the tile of the second image having the highest similarity to the tile of the first image; and
   performing tile rendering, according to the determined tile rendering order,
   wherein the determining of the tile of the second image having the highest similarity to the tile of the first image includes,
      generating a bitstream including identification information of the draw command for each tile of the first image and the second image, based on a result of the tile binning, and
      determining the tile of the second image having the highest similarity to the tile of the first image, by comparing a bitstream of the tile of the first image and a bitstream of each of a plurality of tiles of the second image.

2. The method of claim 1, wherein the performing of the tile binning further comprises:
   receiving the draw command;
   dividing the draw command into batches and assigning the batches to the one or more graphics processors; and
   in response to a first batch from among the batches being assigned to a first graphics processor among the one or more graphics processors, performing tile binning on each of the first and second images, based on the first batch and state information corresponding to the first batch.

3. The method of claim 1, wherein the determining of the tile of the second image having the highest similarity to the tile of the first image comprises:
   obtaining binning information indicating whether the draw command is performed on each tile of the first image and the second image, based on the result of the tile binning; and
   determining the tile of the second image having the highest similarity to the tile of the first image, based on the obtained binning information.

4. The method of claim 1, wherein the tile of the second image having the highest similarity to the tile of the first image is determined by comparing a bitstream of a first tile of the first image and a bitstream of each of the plurality of tiles of the second image corresponding to the first tile in a predetermined range.

5. The method of claim 1, wherein the tile rendering order is determined such that the determined tiles of the first image and the second image are sequentially tile-rendered by a same graphics processor.

6. The method of claim 1, wherein the draw command comprises state information of each of the first image and second image.

7. The method of claim 1, further comprising:
   performing tile rendering on each tile of the first image and the second image of a current time point;
   determining a representative depth value of depth values of the tile of the first image of the current time point, and determining the tile of the second image of the current time point corresponding to the tile of the first image of the current time point, based on the representative depth value;
   determining a tile rendering order for each tile of the first image and the second image of a next time point, based on the determined tiles of the first image and the second image of the current time point; and
   performing tile rendering of the next time point, according to the determined tile rendering order.

8. A tile-based rendering apparatus comprising:
   a plurality of graphics processors configured to perform tile binning on a first image and a second image having binocular disparity, based on a draw command;
   a tile correlator configured to determine a tile of the second image having a highest similarity to a tile of the first image by comparing binning data of each tile of the second image to binning data of the tile of the first image; and
   a scheduler configured to determine a tile rendering order for each tile of the first image and the second image, based on a result of the determining of the tile of the second image having the highest similarity to the tile of the first image,
   wherein the plurality of graphics processors is configured to perform tile rendering according to the determined tile rendering order,
   wherein the correlator is configured to generate a bitstream including identification information of the draw command for each tile of the first image and the second image, based on a result of the tile binning, and to determine the tile of the second image having the highest similarity to the tile of the first image, by comparing a bitstream of the tile of the first image and a bitstream of each of a plurality of tiles of the second image.

9. The apparatus of claim 8, wherein the scheduler is configured to receive the draw command, divide the draw command into batches, and assign the batches to the plurality of graphics processors; and a first graphics processor is configured to, in response to the scheduler assigning a first batch from among the batches to the first graphics processor of the plurality of graphics processors, perform tile binning on each of the first image and the second image based on the first batch and state information corresponding to the first batch.

10. The apparatus of claim 8, wherein the correlator is configured to obtain binning information indicating whether the draw command is performed on each tile of the first image and the second image, based on the result of the tile binning, and to determine the tile of the second image having the highest similarity to the tile of the first image, based on the obtained binning information.

11. The apparatus of claim 8, wherein the correlator is configured to determine the tile of the second image having the highest similarity to the tile of the first image by comparing a bitstream of a first tile of the first image and a bitstream of each of the plurality of tiles of the second image corresponding to the first tile in a predetermined range.

12. The apparatus of claim 8, wherein the scheduler is configured to determine the tile rendering order such that the determined tiles of the first image and the second image are sequentially tile-rendered by a same graphics processor.

13. The apparatus of claim 8, wherein the plurality of graphics processors is configured to perform tile rendering on each tile of the first image and the second image of a current time point;
the tile correlator is configured to determine a representative depth value of depth values of the tile of the first image of the current time point, and to determine the tile of the second image of the current time point corresponding to the tile of the first image of the current time point, based on the representative depth value;
the scheduler is configured to determine a tile rendering order for each tile of the first image and the second image of a next time point, based on the determined tiles of the first image and the second image of the current time point; and
the plurality of graphics processors is configured to perform tile rendering of the next time point, according to the determined tile rendering order.

14. The apparatus of claim 8, wherein the draw command comprises state information of each of the first image and the second image.

15. A non-transitory computer readable storage medium having stored thereon a program, which when executed by a computer, performs the method according to claim 1.

* * * * *